(12) United States Patent
Legiret et al.

(10) Patent No.: US 6,190,158 B1
(45) Date of Patent: Feb. 20, 2001

(54) COMBUSTION PROCESS AND ITS USES FOR THE PRODUCTION OF GLASS AND METAL

(75) Inventors: Thierry Legiret; Laurent Rio, both of Paris (FR)

(73) Assignee: L'Air Liquide, Societe Anonyme pour l'Etude et l'Exploitation des Procedes Georges Claude, Paris (FR)

(*) Notice: Under 35 U.S.C. 154(b), the term of this patent shall be extended for 0 days.

(21) Appl. No.: 09/467,949

(22) Filed: Dec. 21, 1999

(30) Foreign Application Priority Data

Dec. 30, 1998 (FR) .................................. 98 16634

(51) Int. Cl.$^7$ ................ F23C 5/00; F23M 3/04
(52) U.S. Cl. ................ 431/8; 431/12; 431/181; 431/187
(58) Field of Search ................ 431/8, 10, 12, 431/9, 187, 181, 186, 188, 190, 353; 239/424, 404, 405, 406

(56) References Cited

U.S. PATENT DOCUMENTS

| | | | |
|---|---|---|---|
| 4,846,666 | * 7/1989 | Bilawa | 431/187 |
| 4,933,163 | 6/1990 | Fischer et al. | 431/8 |
| 5,178,533 | * 1/1993 | Collenbusch et al. | 431/8 |
| 5,295,816 | * 3/1994 | Kobayashi et al. | 431/187 |
| 5,743,723 | * 4/1998 | Iatrides et al. | 431/8 |
| 5,904,475 | * 5/1999 | Ding | 431/8 |

FOREIGN PATENT DOCUMENTS 0 643 262  3/1995 (EP).
0 763 692  3/1997 (EP).

* cited by examiner

Primary Examiner—James C. Yeung
(74) Attorney, Agent, or Firm—Burns, Doane, Swecker & Mathis, LLP

(57) ABSTRACT

The invention relates to a process for the combustion of a fuel in a burner (1) of the type comprising at least one injector (2), which injector includes at least an inner first oxidizer feed passage (8), an intermediate fuel feed passage (9) externally surrounding the first oxidizer feed passage, and an outer second oxidizer feed passage (10) externally surrounding the fuel feed passage. The fuel feed passage (9) is supplied so that the velocity of the fuel exiting this passage is between approximately 1 and 15 m/s.

Application to the supply of heat in processes for the production of materials.

28 Claims, 2 Drawing Sheets

COMBUSTION PROCESS AND ITS USES FOR THE PRODUCTION OF GLASS AND METAL

BACKGROUND OF THE INVENTION

1. Field of the Invention

The subject of the present invention is a process for the combustion of a fuel in a burner of the type comprising an injector, which injector includes at least an inner first oxidizer feed passage, an intermediate fuel feed passage externally surrounding the first oxidizer feed passage, and an outer second oxidizer feed passage externally surrounding the fuel feed passage.

2. Description of the Related Art

The invention applies in particular to the supply of heat in processes for the production of materials.

Many processes for the production of materials, such as glass and ferrous or non-ferrous metals, involve heating steps in which burners of the aforementioned type are used with, for example, methane as the fuel and oxygen as the oxidizer.

The flames produced by these burners must comply with certain constraints.

For example, in the glass production processes, molten glass is generally transferred between two successive steps of the process by means of feeders. In such a feeder, the glass lying near the walls of the feeder tends to cool much more rapidly than the glass further away from these walls. Consequently, it is desirable to be able to reheat the periphery of the glass without reheating the core of the latter, in order to maintain an approximately homogeneous temperature profile in the sections of the molten material.

For this purpose, burners of the aforementioned type are placed in the walls of these transfer feeders. Unfortunately, the known combustion processes using burners of the aforementioned type do not always make it possible to adjust the length of the flames produced in order to satisfactorily heat the sections of the molten material fed.

Such is the case for the process described by document EP-A-763,692, in which the velocities of the fuel and of the internal oxygen exiting the injector are relatively high.

Similarly, the known combustion processes do not make it possible to comply with the constraints relating to the concentrations of the oxidizing species CO and $O_2$, these being related to the length of the flame, at the exit of the burners placed near the baths of molten materials in metal production processes.

The object of the invention is to solve these problems by providing a combustion process for a burner of the aforementioned type, making it possible for the length of the flame and the concentrations of chemical species in it, especially CO and $O_2$, to be finely adjusted.

SUMMARY OF THE INVENTION

For this purpose, the subject of the invention is a process for the combustion of a fuel in a burner of the aforementioned type, characterized in that the fuel feed passage is supplied so that the velocity of the fuel exiting this passage is between approximately 1 and 15 m/s.

According to particular methods of carrying out the process according to the invention, it may comprise one or more of the following characteristics, taken separately or in any technically possible combination:

the fuel feed passage is supplied so that the velocity of the fuel exiting this passage is greater than approximately 5 Am/s;

the first oxidizer feed passage and the fuel feed passage are supplied so that the ratio R of the velocity of the oxidizer exiting the first oxidizer feed passage to the velocity of the fuel exiting the fuel feed passage is greater than approximately 3;

the first oxidizer feed passage and the fuel feed passage are supplied so that the ratio R is less than approximately 20;

the first oxidizer feed passage and the fuel feed passage are supplied so that the ratio R is less than approximately 10;

the second oxidizer feed passage is supplied so that the velocity of the oxidizer exiting this second passage is between approximately 0.1 and 50 m/s and preferably between approximately 1 and 5 m/s;

the first and second oxidizer feed passages are supplied so that less than 50%, and preferably less than approximately 20%, of the total oxidizer flow passes through the first oxidizer feed passage;

a peripheral passage of the injector is supplied with air, which peripheral passage externally surrounds the second oxidizer feed passage;

the first and second oxidizer feed passages are supplied with oxygen having a purity of greater than 80%; and the fuel feed passage is essentially supplied with a gaseous hydrocarbon, especially with methane or butane.

The subject of the invention is also a use of a process as defined above for making it possible, by modifying the proportion of the total oxidizer flow passing through the first oxidizer feed passage, to adjust the length of a flame for heating a molten-glass transfer feeder in the production of glass.

Furthermore, the subject of the invention is a use of a process as defined above for making it possible, by modifying the proportion of the total oxidizer flow passing through the first oxidizer feed passage, to adjust the oxidizing power of a heating flame produced in the production of metal.

BRIEF DESCRIPTION OF THE FIGURES OF THE DRAWING

The invention will be more clearly understood on reading the description which follows, given solely by way of example, and with reference to the appended drawings in which.

DETAILED DESCRIPTION OF THE PREFERRED EMBODIMENTS

Figure 1:
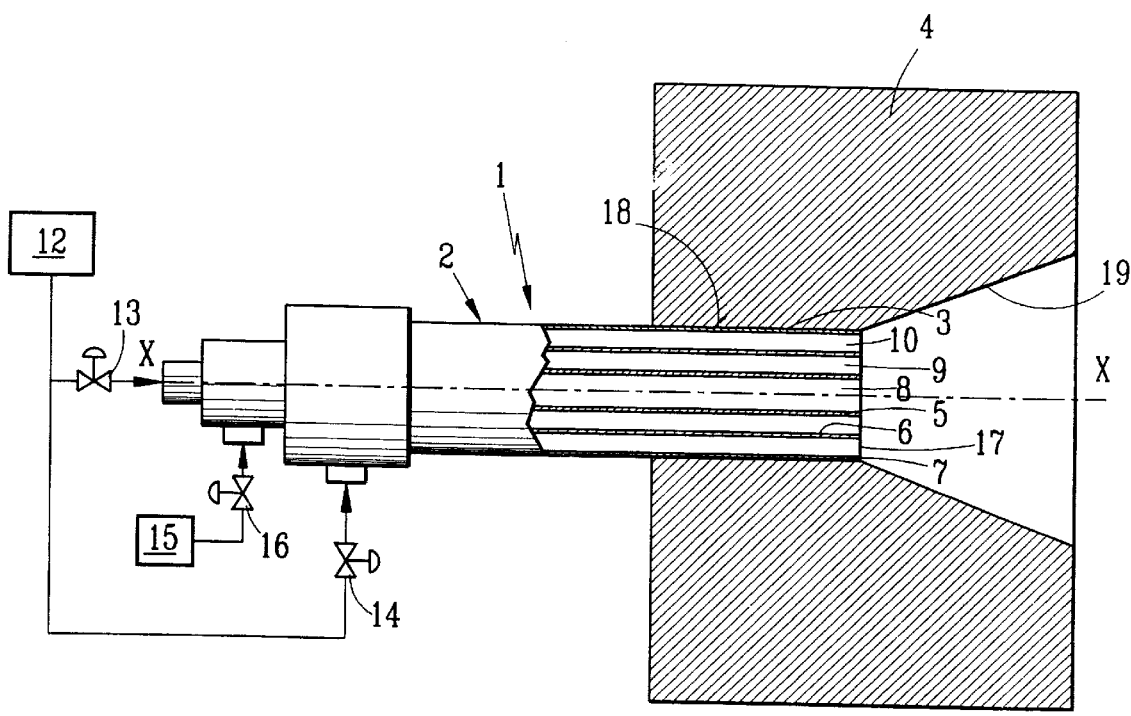
FIG. 1 is a transverse schematic view, partially in cross section, of a burner intended to implement a process according to the invention.

FIG. 1 shows schematically a burner 1 comprising an injector 2 inserted into the axisymmetric orifice or quarl 3 of a block 4 made of refractory material.

This block 4 is itself mounted in the wall of a furnace or, for example, of a feeder of a glass production plant.

The injector 2 essentially comprises three coaxial tubes 5, 6 and 7 of axis X—X and of circular cross section.

The inner tube 5 internally defines an inner first oxidizer feed passage 8. The intermediate tube 6 externally surrounds the tube 5 and defines with it an intermediate fuel feed passage 9. The outer tube 7 externally surrounds the intermediate tube 6 and defines with it an outer second oxidizer feed passage 10.

A supply 12 of oxidizer, for example oxygen ($O_2$) having a purity of greater than 80%, is connected via valves 13 and 14 to the upstream ends (on the left in FIG. 1) of the oxidizer feed passages 8 and 10, respectively.

A supply of fuel 15, for example gaseous methane ($CH_4$), is connected via a valve 16 to the upstream end (on the left in FIG. 1) of the fuel feed passage 9.

The downstream ends of the tubes 5 to 7 are approximately aligned transversely to the axis X—X, thus defining a downstream or exit face 17 of the injector 2. However, and as described in the aforementioned document EP-A-763,692, the downstream ends of the tubes 5 to 7 may be shifted along the axis X—X and one of the tubes 5 to 7 may be off-axis with respect to the other tubes.

The quarl 3 comprises an upstream part 18 of circular cross section and a downstream part 19 of frustoconical general shape which diverges towards the downstream end. The downstream end of the injector 2 is inserted into the upstream part 18 of the quarl 3. The downstream face 17 of the injector 2 lies level with the junction of the upstream 18 and downstream 19 parts of the quarl 3. The quarl 3 and the injector 2 are coaxial.

In operation, a stream of fuel expelled from the passage 9, on the one hand, externally surrounds a stream of oxygen coming from the inner passage 8 and, on the other hand, is externally surrounded by another stream of oxygen coming from the outer passage 10. A flame is formed at the exit of the injector 2 by the combustion of $CH_4$ in the presence of $O_2$. During the combustion reaction, the $O_2$ is consumed in order to form CO and then $CO_2$ and water ($H_2O$) from the $CH_4$.

Thus, the axial concentration (along the axis X—X) of $O_2$ gradually decreases from the exit of the injector 2 towards the downstream end of the flame formed, while the $CO_2$ concentration increases. The CO concentration increases and then decreases from the exit of the injector 2 as far as the downstream end of the flame. Thus, the axial concentration of CO has a peaked general profile.

The valves 13 and 14 allow the amount of oxygen passing through the oxidizer feed passages 8 and 10 respectively to be varied and therefore the velocities of the oxygen exiting these passages 8 and 10 to be adjusted. The valves 13 and 14 also make it possible to adjust the distribution of the total oxygen flow between the first oxidizer feed passage 8 and the second oxidizer feed passage 10. The valve 16 allows the amount of methane passing through the fuel feed passage 9 to be varied and therefore the velocity of the methane exiting this passage 9 to be adjusted.

According to a first example, the valve 16 is adjusted so that the velocity of the fuel exiting the passage 9 is approximately 11 m/s.

Figure 2:
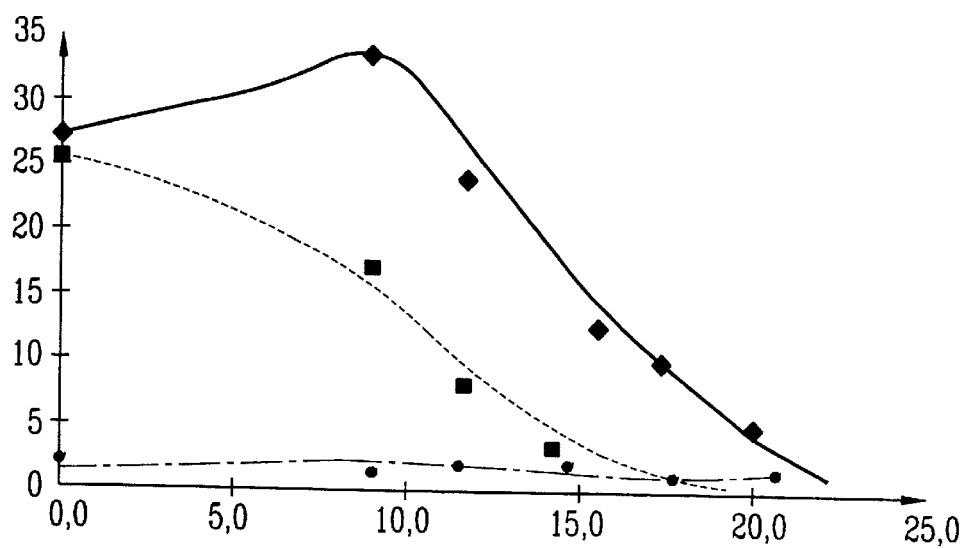
FIGS. 2 and 3 are diagrams illustrating, respectively, the capabilities of adjusting the relative proportion of CO in the flame and of the length of the flame exiting the burner in FIG. 1 by means of a process according to the invention.

FIG. 2 is a diagram which illustrates the possibilities thus offered for adjusting the characteristics of the flame.

In this diagram, the x-axis represents the proportion P of $O_2$ injected into the inner passage 8 with respect to the total $O_2$ injected into the passages 8 and 10. The y-axis represents the, proportion of CO with respect to all the species present on the axis X—X of the flame at 0.635 m from the exit of the injector 2.

A first measurement curve, plotted as the dotted line, corresponds to a combustion process employed with a burner 1 whose inner tube 5 has an inside diameter of approximately 2 mm and the intermediate tube 6 has an inside diameter of approximately 15 mm. The power of the burner 1 is approximately 60 kW, which corresponds approximately to the injection of 6 $Sm^3/h$ of $CH_4$ and to the total injection of 12 $Sm^3/h$ of $O_2$.

For P=0%, the proportion of CO is approximately 25%. The flame produced therefore measures more than 0.635 m. In fact, it is found that it measures approximately 1 m.

This first curve decreases relatively markedly when P varies from 0 to approximately 15%. This decrease corresponds to the decreasing part of the peaked general profile of the axial concentration of CO in the flame.

Consequently, the more the proportion P increases, the more the length of the flame produced decreases, and this variation is relatively significant when P varies between 0 and 15%. It is therefore possible to adjust the length of the flame produced by varying P.

The velocity of the $O_2$ exiting the internal passage 8 is approximately 212 m/s and 33 m/s when P is approximately 20% and 3.10%, respectively. Thus, the ratio R of the velocity of the $O_2$ exiting the internal passage 8 to the velocity of the $CH_4$ exiting the passage 9 is approximately 19.3 and 3 when P is 20% and 3.1%, respectively.

The second measurement curve, plotted as a solid line, corresponds to a combustion process which differs from that of the first curve in that it is obtained on a burner 1 whose inner tube 5 has an inside diameter of approximately 3.5 mm.

When P=0%, the proportion of CO is slightly greater than 25%. However, the same proportion of CO as for the dotted curve, that is to say 25%, should be found. This is because, for P=0%, the injection conditions are the same for the dotted curve and the solid curve since no oxidizer is injected via the first passage 8. The slight difference observed at P=0% is due to the uncertainty in the measurement.

This second, solid curve has a peaked profile with, on the one hand, a part which increases relatively strongly when P varies between 0 and approximately 10% and, on the other hand, a part which decreases relatively strongly when P varies between approximately 10 and 20%. The increasing and decreasing parts of the second curve correspond to the increasing and decreasing parts, respectively, of the peaked general profile of the axial concentration of CO in the flame produced.

The ratio R has a value of approximately 3 when P is 10% and approximately 6 when P is 20%.

The length of the flame produced decreases when P varies from 0 to approximately 20%. It is therefore possible for the length of the flame produced to be adjusted more finely than in the case of the first, dotted curve.

The third measurement curve, plotted as a dot-dash line, corresponds to a combustion process employed in the burner 1 of the first curve and in which the velocity of the methane exiting the passage 9 is approximately 75 m/s.

The third curve is approximately a horizontal line. When P=0%, the proportion of CO is approximately 2%. The third curve therefore corresponds to the tail of the peaked general profile of the axial concentration of CO in the flame produced. Thus, the possibility of varying the proportion of CO at the chosen measurement point, and therefore the length of the flame, is approximately zero.

In contrast, for the first two curves, this possibility exists because of the non-constant profiles presented by these curves.

Figure 3:
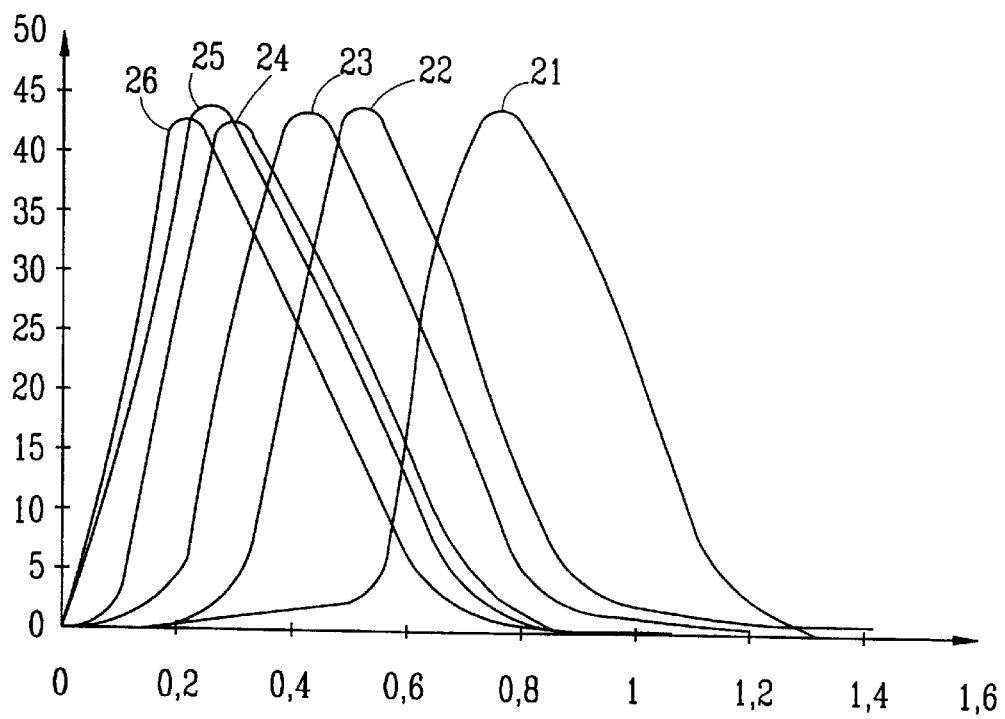

FIG. 3 illustrates, for the process corresponding to the solid curve in FIG. 2, the variation in the relative proportion of CO with respect to the other species present on the flame axis X—X for various proportions P of oxygen injection between the inner 8 and outer 10 passages. The x-axis represents the distance separating the measurement point from the exit of the injector 2.

The measurement curves 21 to 26 correspond to the case in which the proportion P of oxygen injected into the passage 8 with respect to the total injected oxygen is approximately 0%, 10%, 12.5%, 15%, 17.5% and 20%, respectively.

Each of the curves 21 to 26 has a peaked profile.

It is found that when the proportion P of oxygen injected into the inner passage 8 increases, the CO peak tends to move towards the exit of the injector 2. The length of the flame therefore decreases, the combustion being more rapid and the temperature at the exit of the injector 2 being higher.

It is therefore found that by varying the distribution of oxygen injected between the inner 8 and outer 9 oxidizer feed passages, the length of the flame and the axial concentration of CO, and therefore of $O_2$ and $CO_2$, in the latter may be accurately adjusted.

In order to obtain the best adjustment possibilities, the velocity of the fuel exiting the intermediate passage 9 must be between approximately 1 and 15 m/s, and preferably between approximately 5 and 15 m/s, and the velocity ratio R must be between 3 and 20 and preferably between 3 and 10.

Thus, with a relatively low velocity of fuel exiting the intermediate passage 9 and a relatively high velocity ratio R, the shear between the inner stream of oxidizer and the stream of fuel is relatively high. This characteristic makes it possible for the length of the flame to be very finely varied, this length decreasing when the shear increases because of the increase in turbulence and of more intimate mixing of the inner stream of oxygen with the stream of fuel.

In order to further improve the adjustment possibilities, the velocity of the oxidizer exiting the second passage must be between approximately 0.1 and 50 m/s and preferably between approximately 1 and 5 m/s.

Finally, it appears that the possibilities of adjustment are enhanced when the proportion P is between 0 and 50% and preferably between 0 and 20%.

Such a combustion process can be used in particular in processes for the production of materials.

For example, by means of the enhanced possibilities of adjusting the concentrations of oxidizing species CO and $O_2$ on the exit side of the injector 2, by varying the proportion P, this combustion process is particularly suitable for metal production processes.

Figure 4:
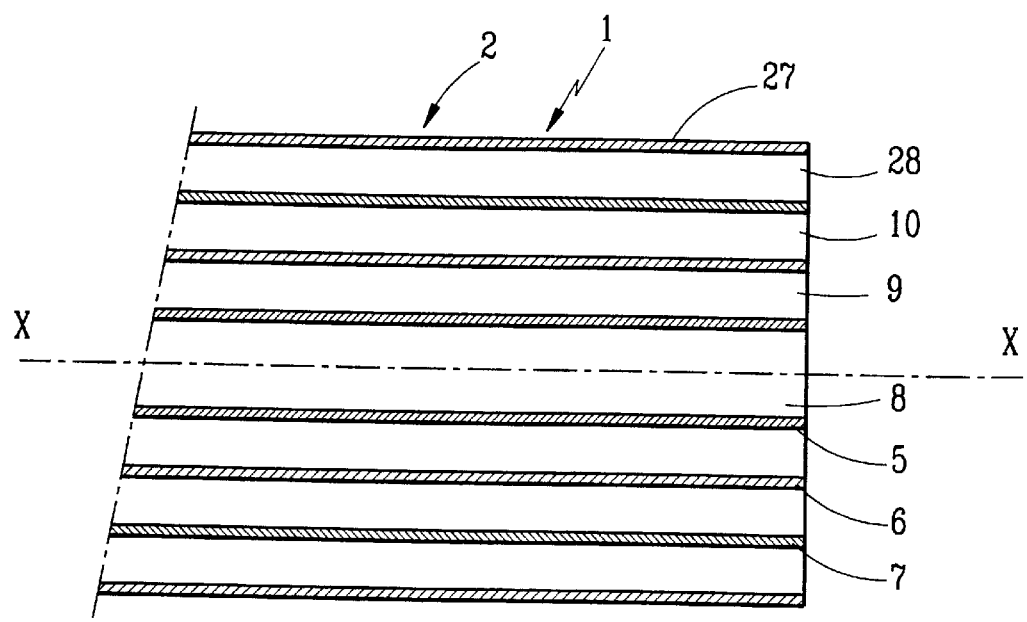
FIG. 4 is an enlarged partial schematic view, in cross section, of the downstream end of an alternative embodiment of the burner in FIG. 1.

For such an application, the process is preferably employed on a burner 1, like that in FIG. 4, the injector 2 of which comprises a fourth tube 26 externally surrounding the tube 7 so as to define with the tube 7 a passage 27 for transferring an outer stream of air.

This combustion process is also particularly suitable for heating molten glass when this is transferred in feeders in glass production processes. This is because this process makes it possible, for example, by varying the proportion p, to obtain a flame short enough on the exit side of the injector 2 not to heat the core of the molten glass transferred by a feeder.

What is claimed is:

1. A process for controlling the length of the flame during the combustion of a fuel in a burner, the burner including an injector, which injector includes at least an inner first oxidizer feed passage, an intermediate fuel feed passage externally surrounding the inner first oxidizer feed passage, and an outer second oxidizer feed passage externally surrounding the fuel feed passage, the process comprising the steps:

supplying the fuel feed passage with fuel so that the velocity of the fuel exiting this passage is between approximately 1 and 15 ml/s;

supplying oxygen to both the inner first oxidizer feed passage and the outer second oxidizer feed passage; and regulating the step of supplying oxygen between the inner first oxidizer feed passage and the outer second oxidizer feed passage to regulate the length of the flame.

2. A process according to claim 1, wherein the step of supplying the fuel feed passage comprises supplying so that the velocity of the fuel exiting the fuel feed passage is greater than approximately 5 m/s.

3. A process according to claim 2, wherein the steps of supplying the first oxidizer feed passage and of supplying the fuel feed passage comprise supplying so that a ratio R of the to the velocity of the fuel exiting the fuel feed passage is greater than approximately 3.

4. A process according to claim 3, wherein the steps of supplying the first oxidizer feed passage and of supplying the fuel feed passage comprise supplying so that the ratio R is less than approximately 20.

5. A process according to claim 4, wherein the steps of supplying the first oxidizer feed passage and of supplying the fuel feed passage comprise supplying so that the ratio R is less than approximately 10.

6. A process according to claim 2, wherein the step of supplying the second oxidizer feed passage comprises supplying so that the velocity of the oxidizer exiting the second oxidizer feed passage is between approximately 0.1 m/s and 50 m/s.

7. A process according to claim 6, wherein the step of supplying the second oxidizer feed passage comprises supplying so that the velocity of the oxidizer exiting the second oxidizer feed passage is between approximately 1 m/s and 5 m/s.

8. A process according to claim 2, wherein the step of supplying the first and second oxidizer feed passages comprises supplying so that less than 50% of the total oxidizer flow passes through the first oxidizer feed passage.

9. A process according to claim 8, wherein the step of supplying the first and second oxidizer feed passages comprises supplying so that less than approximately 20% of the total oxidizer flow passes through the first oxidizer feed passage.

10. A process according to claim 2, wherein the injector further includes a peripheral passage which externally surrounds the second oxidizer feed passage, the process further comprising the step:

supplying air through the peripheral passage.

11. A process according to claim 2, wherein the step of supplying the first and second oxidizer feed passages comprises supplying with oxygen having a purity of greater than 80%.

12. A process according to claim 2, wherein the step of supplying the fuel feed passage comprises supplying with a gaseous hydrocarbon.

13. A process according to claim 12, wherein the step of supplying the fuel feed passage comprises supplying with a gaseous hydrocarbon selected from the group consisting of methane and butane.

14. A process according to claim 1, wherein the steps of supplying the first oxidizer feed passage and of supplying the fuel feed passage comprise supplying so that a ratio R of the velocity of the oxidizer exiting the first oxidizer feed passage to the velocity of the fuel exiting the fuel feed passage is greater than approximately 3.

15. A process according to claim 14, wherein the steps of supplying the first oxidizer feed passage and of supplying the fuel feed passage comprise supplying so that the ratio R is less than approximately 20.

16. A process according to claim 15, wherein the steps of supplying the first oxidizer feed passage and of supplying the fuel feed passage comprise supplying so that the ratio R is less than approximately 10.

17. A process according to claim 1, wherein the step of supplying the second oxidizer feed passage comprises supplying so that the velocity of the oxidizer exiting the second oxidizer feed passage is between approximately 0.1 m/s and 50 m/s.

18. A process according to claim 17, wherein the step of supplying the second oxidizer feed passage comprises supplying so that the velocity of the oxidizer exiting the second oxidizer feed passage is between approximately 1 m/s and 5 m/s.

19. A process according to claim 1, wherein the step of supplying the first and second oxidizer feed passages comprises supplying so that less than 50% of the total oxidizer flow passes through the first oxidizer feed passage.

20. A process according to claim 19, wherein the step of supplying the first and second oxidizer feed passages comprises supplying so that less than approximately 20% of the total oxidizer flow passes through the first oxidizer feed passage.

21. A process according to claim 1, wherein the injector further includes a peripheral passage which externally surrounds the second oxidizer feed passage, the process further comprising the step:

supplying air through the peripheral passage.

22. A process according to claim 1, wherein the step of supplying the first and second oxidizer feed passages comprises supplying with oxygen having a purity of greater than 80%.

23. A process according to claim 1, wherein the step of supplying the fuel feed passage comprises supplying with a gaseous hydrocarbon.

24. A process according to claim 23, wherein the step of supplying the fuel feed passage comprises supplying with a gaseous hydrocarbon selected from the group consisting of methane and butane.

25. A process for the production of glass which comprises using the process of claim 1 to modify the proportion of total oxidizer flow passing through the first oxidizer feed passage to thereby adjust the length of a flame for heating a molten glass transfer feeder in the production of glass.

26. A process for the production of glass which comprises using the process of claim 2 to modify the proportion of total oxidizer flow passing through the first oxidizer feed passage to thereby adjust the length of a flame for heating a molten glass transfer feeder in the production of glass.

27. A process for the production of metal which comprises using the process of claim 1 to modify the proportion of total oxidizer flow passing through the first oxidizer feed passage to thereby adjust the oxidizing power of a heating flame produced in the production of metal.

28. A process for the production of metal which comprises using the process of claim 2 to modify the proportion of total oxidizer flow passing through the first oxidizer feed passage to thereby adjust the oxidizing power of a heating flame produced in the production of metal.

* * * * *